United States Patent [19]

Bellamy

[11] Patent Number: 4,675,536
[45] Date of Patent: Jun. 23, 1987

[54] APPARATUS FOR EXTRACTING ENERGY FROM THE WAVES IN A BODY OF LIQUID

[75] Inventor: Norman W. Bellamy, Coventry, England

[73] Assignee: Sea Energy Associates Limited, Feltham, England

[21] Appl. No.: 757,046

[22] Filed: Jul. 19, 1985

[30] Foreign Application Priority Data

Jul. 19, 1984 [GB] United Kingdom ............... 8418392

[51] Int. Cl.⁴ ............................................. F03B 13/12
[52] U.S. Cl. ....................................... 290/42; 290/53; 415/7; 416/85; 417/331; 60/495; 60/498
[58] Field of Search .................... 290/42, 43, 53, 54; 415/5, 7; 416/84–86; 417/330–332, 337; 60/495–500, 502

[56] References Cited

U.S. PATENT DOCUMENTS

| | | | |
|---|---|---|---|
| 4,048,512 | 9/1977 | Wood | 290/42 X |
| 4,164,383 | 8/1979 | French | 290/53 X |
| 4,300,871 | 11/1981 | Laithwaite et al. | 417/331 |
| 4,568,836 | 2/1986 | Reenberg | 290/42 X |

FOREIGN PATENT DOCUMENTS

| | | | |
|---|---|---|---|
| 5484180 | 7/1981 | Australia. | |
| 537894 | 7/1984 | Australia. | |
| 411355 | 6/1910 | France. | |
| 1492427 | 11/1977 | United Kingdom | 290/53 |
| 2060082 | 4/1981 | United Kingdom. | |
| 2075127 | 11/1981 | United Kingdom | 290/53 |
| 2081816 | 2/1982 | United Kingdom. | |
| 2106597 | 4/1983 | United Kingdom | 290/53 |

Primary Examiner—Peter S. Wong
Assistant Examiner—Emanuel Todd Voeltz
Attorney, Agent, or Firm—Popper, Bobis & Jackson

[57] ABSTRACT

The invention describes an energy extractor for extracting energy from waves in the sea. A ring spine is disclosed and on the spine, spaced circumferentially thereof are flexible membranes which flex back and forth under the influence of the waves. The back and forth flexing deflects air back and forth and the air movement is used to drive air turbines and electrical generators. Arranging for the spine to be in a ring and spacing the membranes around the ring ensures efficient energy extraction regardless of wave direction.

4 Claims, 12 Drawing Figures

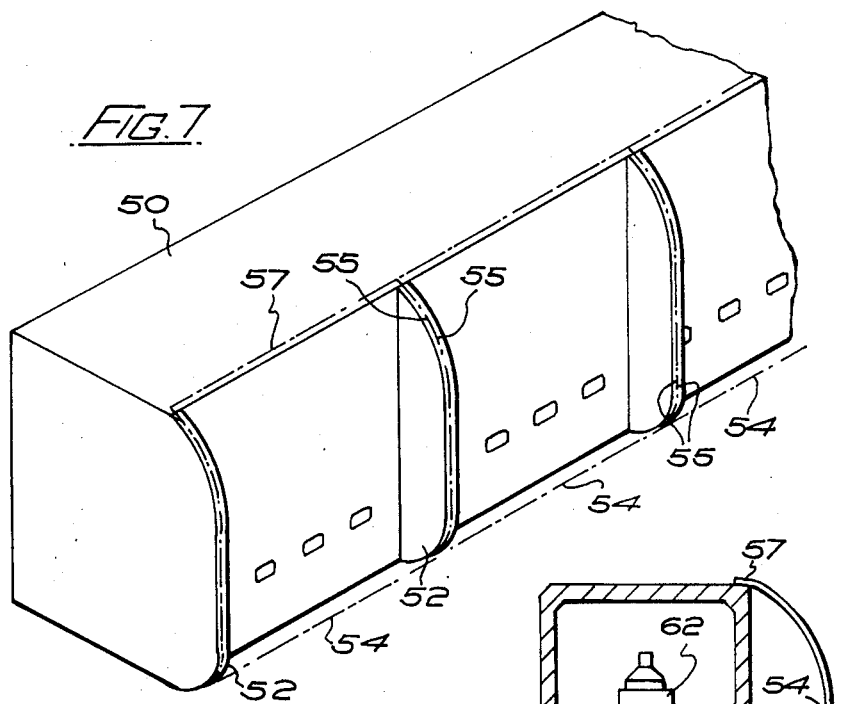
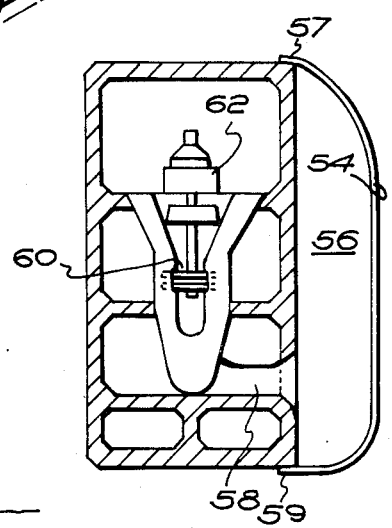
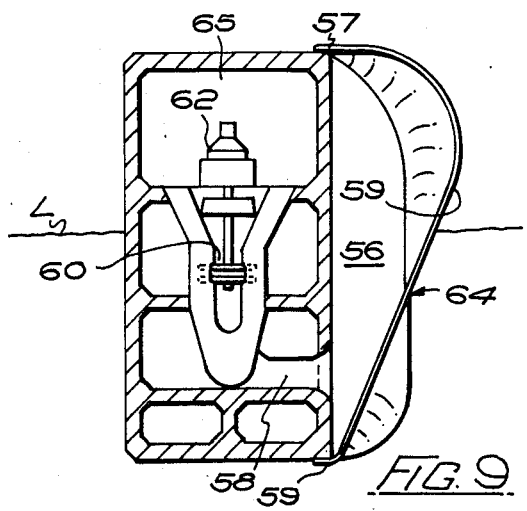

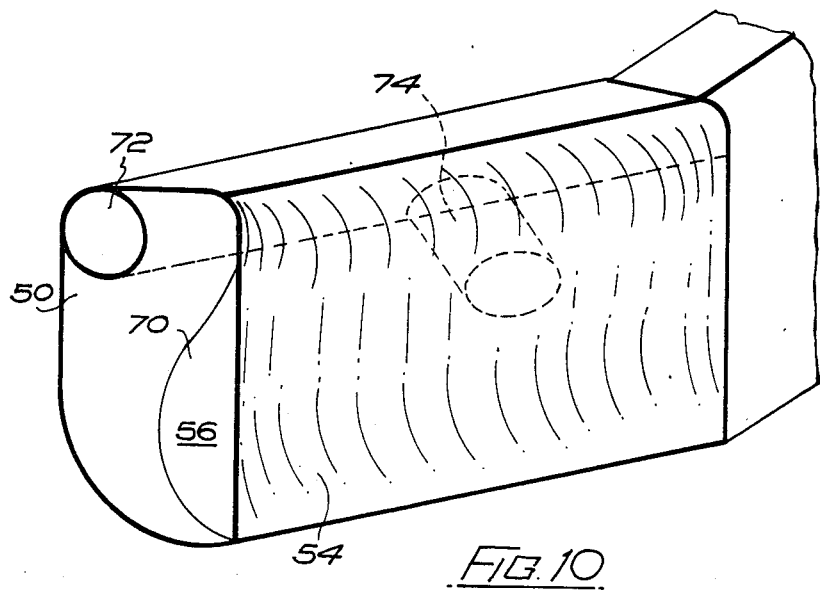
FIG. 10
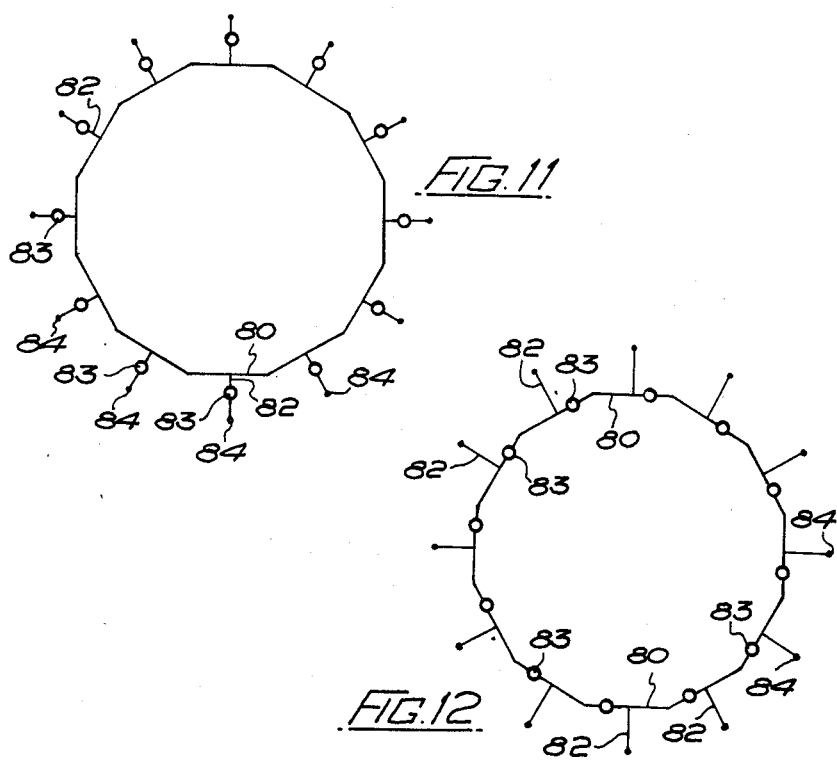
FIG. 11
FIG. 12

APPARATUS FOR EXTRACTING ENERGY FROM THE WAVES IN A BODY OF LIQUID

This invention relates to the apparatus for extracting energy from waves in a body of liquid. In the preferred embodiment, the apparatus will also be designed to convert the energy extracted from the waves into a more readily useable form, such as electrical energy.

There are of course many known systems and apparatus for the extraction and conversion of energy from waves in a body of liquid, in particular the sea, and we are the owners of a number of patents and patent applications, concerned with such technology.

Generally speaking, energy extraction is acheived by locating a member in the body of liquid so that it comes under the influence of the waves, and that member (the drive member) may be moved back and forth under the action of the waves, and this back and forth movement is used to drive another member or fluid eventually to provide energy in a more readily useable form, and the drive member may be a flexible member which deflects in the nature of a diaphragm and serves to pump the fluid, which may be in fact the same liquid as the body of water, or a gaseous fluid such as air, and the fluid pumped is used to drive a suitable prime mover to produce the more readily useable energy.

The known systems have tended to use a long reaction member, commonly referred to as a "spine" which may be a continuous member or may be made up of a number of interconnected elements, and the drive members which are displaceable under the wave action are mounted on the spine. The spine may be arranged in relation to any particular wave front in a termination mode, which means that the length direction of the spine lies at right angles to the direction in which the wave front is progressing; or in the attenuation mode, in which case the spine is arranged with its length direction in the same direction as the advancing direction of the wave front. In the termination mode when the waves strike the drive members, the energy is extracted from the wave and therefore the wave in fact "terminates" at the spine, whereas in the attenuation mode, the wave travels along the length of the spine, displacing the drive members in turn whereby the energy is extracted progressively or the energy in the wave is progressively attenuated.

These known systems have in general been designed to provide large electrical outputs i.e. on the order of eight to ten megawatts, but practical designs have encountered difficulties because of the high capital costs involved in providing such large installations, and furthermore insurance requirements have demanded that the units be constructed in a particular and a somewhat prohibitively expensive fashion. These difficulties have contributed to the view that large units for supplying large electrical outputs are unlikely to be economic in the short term, and this has caused us to examine the possibility of designing units for smaller outputs, for example for the order of one megawatt. Designing spines for smaller units brings its own problems. For example if the spine length is reduced, the stability of the spine in waves in the body of liquid is reduced, especially in the termination mode, so much so that the utilization of a straight spine in a body of liquid for a small application could be unacceptable because of the instability of the spine.

Another difficulty which arises with the straight spine operating in the termination mode, is that the vertical stability of the apparatus is not good in that the mounting of the drive members on one side of the spine (the side which faces the wave front) leads to a tendency for the apparatus to take up a position in which the spine is tilted about an axis running lengthwise up the spine. This can be corrected by appropriate ballasting of the spine, but ballasting increases the expense of the apparatus.

The present invention was conceived in relation to the production of a small sized apparatus, but the technical advantages achieved from the apparatus are such that it can be used in large or small scale applications, and in accordance with the present invention, the spine for receiving the drive members in a wave energy extraction apparatus is constructed on a ring principle. By constructing on a ring principle, it is meant that the spine is in fact endless, but it is not necessary that the spine should define a circular ring, or indeed that the ring should be curved, because also within the invention it is envisaged that the ring may be triangular in shape.

It is preferred that there will be drive members for energy extraction arranged around the ring, preferably to the outside of the ring, but they may also be on the inside.

Each drive member suitably is a flexible bag mounted on the spine in the manner indicated in our co-pending patent application No. 8220489, or as disclosed in our British Pat. No. 2075127. By using a ring construction and drive members around the outside of the ring, the centre of gravity of the whole apparatus can be arranged to be on the centre of the ring, so that there will be no vertical stability problems concerning the support of the apparatus in the body of liquid. Equally, as the apparatus will inevitably span several wave fronts, there is no longitudinal instability, or not the same longitudinal instability as associated with short, straight spine arrangements. Furthermore, the drive members can extract the energy both simultaneously (termination mode) and sequentially (attenuation mode) depending upon the wave front, but in any event there will be a certain degree of sequential extraction of energy by the respective drive members.

If the drive members are appropriately interlinked so as to inter-react and there are damping arrangements, the amount of energy which is extracted by any one drive member in relation to the others can be controlled.

In a particularly suitable construction, the drive members are flexible bags which are pillow shaped, with the longer direction of the bag lying circumferentially of the ring spine. At the top corners of adjacent bags, the bags are fluidly interconnected by a duct and each duct preferably includes an energy conversion apparatus in the form of a uni-directional turbine driving an electrical generator. As any one flexible bag is compressed therefore under the action of a wave, the fluid, typically air, displaced therefrom will flow out of either or each corner outlet, causing rotation of the turbine in the duct, and when the bag is being supplied with air from an adjacent bag, the turbine again will be driven, and will continue to rotate in the same direction whereby uni-directional electrical power outlet is acheived. A suitable means may be provided for aggregating the electrical outputs to provide total electrical energy output from the apparatus.

The ring spine may be made up of individual sections which are mechanically connected so as to be capable of limited relative tilting, or it may be a rigid structure, and the ring may be provided if necessary with tension adjustable spokes to reinforce the apparatus. Each individual ring section may contain a buoyancy chamber which is filled with air or other buoyancy gas or material and which can be partially filled with liquid to vary the sections' buoyancy characteristics. The individual sections may be constructed from welded steel or concrete and may be profiled to suit the profiling of the flexible bag, as will be explained with reference to the embodiment illustrated in the drawings.

Other features and advantages of the apparatus will become apparent in the following which is a description of the preferred embodiment of the invention, the description being given with reference to the accompanying drawings, which are diagrammatic, and wherein:

FIG. 7 is a view similar to FIG. 3 showing an alternative arrangement of flexible drive members;

FIG. 8 is a sectional elevation of the arrangement shown in FIG. 7;

FIG. 9 is a sectional elevation similar to FIG. 8, but showing the drive member in an alternative position;

FIG. 10 is a view similar to FIG. 7 showing an alternative arrangement of flexible drive members; and FIGS. 11 and 12 are fluid circuit diagrams showing parallel and series connections for the turbines and flexible membranes.

Figure 1:
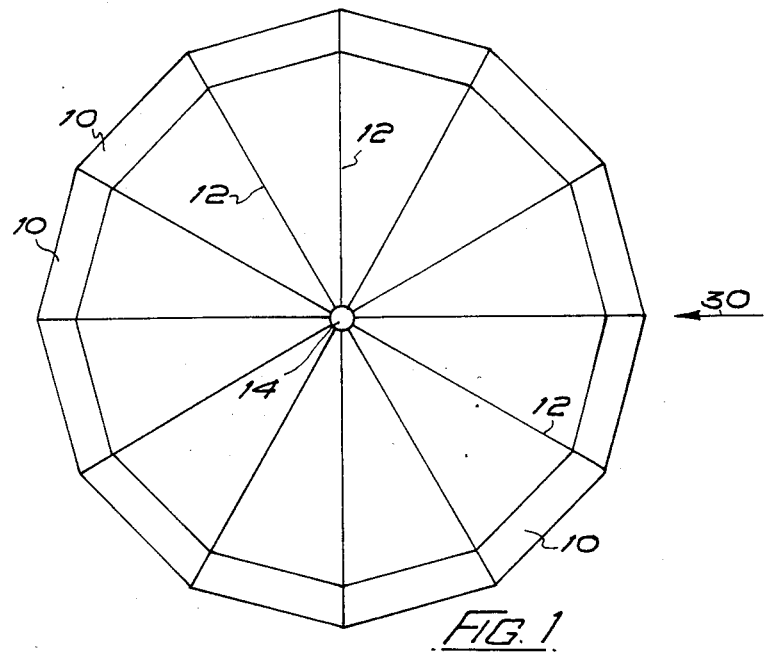
FIG. 1 is a plan view of the apparatus according to the embodiment of the invention.

Referring to the drawings, in FIG. 1 there is shown a ring spine forming part of an apparatus for extracting and converting the energy of waves in a body of liquid, typically the sea, and the ring spine comprises a number of sections 10 connected end to end and reinforced by spokes 12. The spokes 12 are optional and in other embodiments can be omitted. Whilst the sections 10 essentially define a circular spine, it is to be mentioned that it is not necessary that the spine be circular. It could be triangular or rectangular, but it is desirable that it should be continuous.

A hub 14 supports the inner ends of the spokes 12, and the advantage of the construction described is that it has considerable strength and it will be stable in use.

Figure 2:
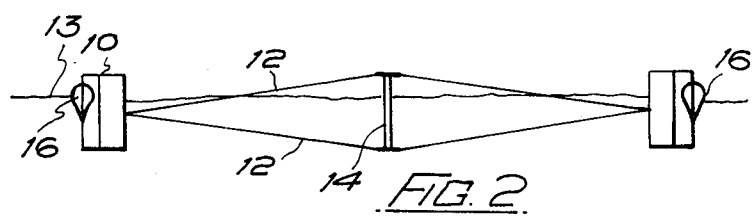
FIG. 2 is a sectional side view of the apparatus shown in FIG. 1.

The apparatus may be designed for floating on the surface of the body of water, or it may be designed for anchorage, for example on the sea bed, but in all cases it must come under the influence of the waves, in order to be functional. FIG. 2 shows by reference 13 the typical water level of the body of water, in relation to the apparatus.

The sections 10 may be put into compression by applying steel cord around the outside of the sections 10, and/or the sections 10 may be adapted for limited relative tilting by being coupled by means of essentially ball and socket type joints.

On the outer surfaces of the sections 10 are flexible bags 16 which form the drive members for the extraction of energy of the waves. These bags contain air or other fluid, and by virtue of the wave action the bags are subjected cyclically to compressive forces whereby they act as pumps, and in each cycle when the wave force subsides, the bag is then free to expand and induce fluid thereinto. This expansion and compression of each bag is utilized for the energy conversion in that the displacement of the fluid by the expansion and contraction is used to drive a prime mover in the form of a uni-directional turbine, and accompanying generator, forming a power conversion unit. As will be explained, two power conversion units are associated with each of the bags and in the manner to be described.

Figure 3:
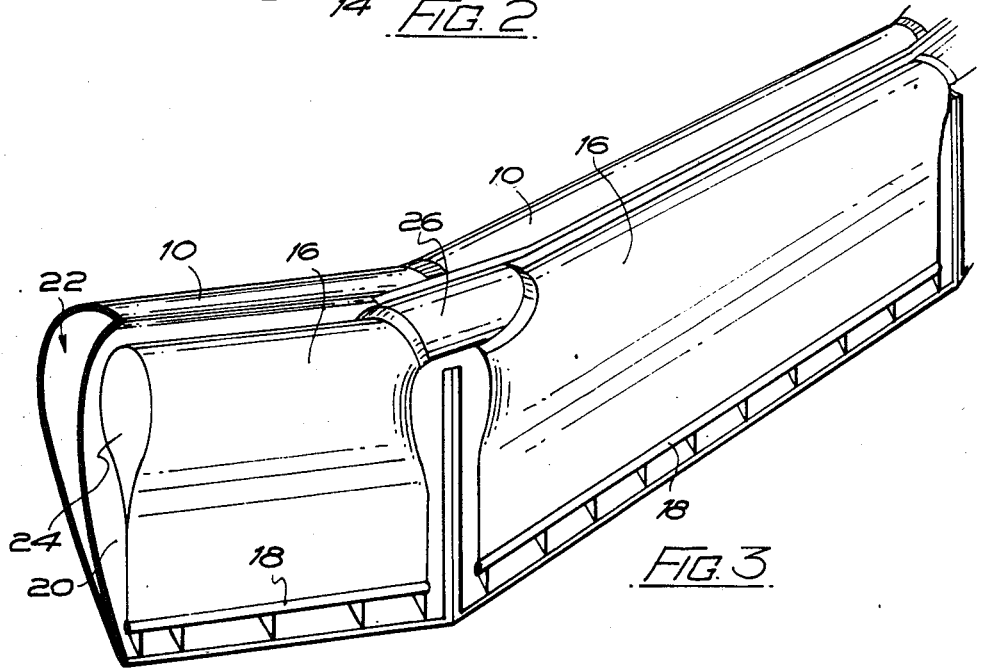
FIG. 3 is a perspective elevation of a part of the apparatus showing how the flexible bags are coupled.

If reference is now made to FIG. 3, this figure shows diagrammatically that the bags 16 are mounted on the spine sections 10 in that the bottom edges 18 of the bags are connected to the lower outer side of the spine sections 10, but there is a space 20 between the rear of the bag and the outer side of the spine 10 into which the water of the body of water can flow as will be explained. The spine element 10 is hollow as shown at 22, but the chamber 22 formed in each spine section 10 is independent and does not fluidically couple with any of the other chambers 22, so that if one chamber 22 floods, then the apparatus will not sink.

The flexible bag 16 is generally pillow shaped, with the longer direction lying horizontally, so that in use the air will collect inside the bag towards the top end thereof as indicated by reference 24. The adjacent bags are connected at the adjacent top corners by means of ducting 26, the ducting 26 containing a power module in the form of a uni-directional turbine, and an electric generator, whereby electrical power output is obtained by virtue of the compressing and relaxing of the bags 16 by the waves. Such compressing and relaxing of the bags causes the air in the bags to flow through the corner ducting 26 in the direction of least resistance. The resistance will be established by the condition of the adjacent bag and in particular whether or not they are under wave forces tending to compress or relax same. A uni-directional turbine gives the advantage that regardless of the direction of the air flow through the duct 26, the turbine will rotate in the same direction.

Figure 4:
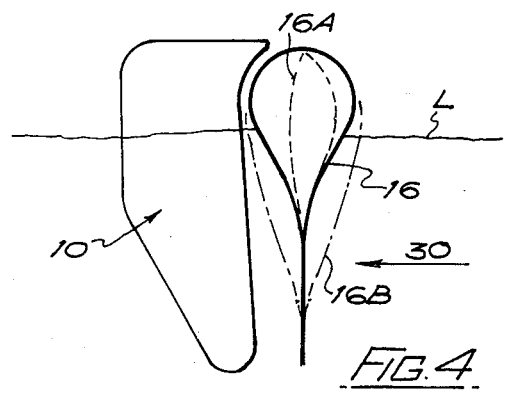
FIG. 4 is a sectional side elevation taken through the spine and a bag.

The flexible bags expand and contract under the wave forces essentially as described in our co-pending application No. 8220489, but the operation will again be briefly described herein with reference to FIG. 4 which shows in section a spine section 10 and a flexible bag 16. In the full line position of bag 16, the apparatus is assumed to be in calm water of level L. As a wave meets the flexible bag 16 in the direction of arrow 30 (see also FIG. 1), the bag is compressed to the dotted line position 16A, and air is expelled in the bag through one or both corner ducts and one or both uni-diretional turbines is or are driven as explained herein. As the wave retreats, the bag 16 relaxes to the chain dotted line position 16B, and air is induced through one or both ducts again driving one or both turbines, the air induction being from one or both adjacent bags 16.

Referring again to FIG. 1, if it is assumed that the wave front approaches the apparatus in the direction of arrow 30 as shown, it will be appreciated that the flexible bags around the apparatus are compressed and relaxed sequentially.

The apparatus of the nature illustrated in FIG. 1 in fact acts as a terminator and an attenuator in that the parts of the waves striking the frontal bags have virtually all of the energy extracted, whilst those parts travelling around the ring structure have the energy extracted progressively. Additionally, the ring structure provides an additional energy extraction effect which is described theoretically as "point extraction" in that there is a tendency for extra energy to be extracted by virtue of the ring construction. Point extraction of energy can be considered to be opposite of point distribution of energy such as takes place when a pebble is dropped in a pool of water.

A model of the apparatus as described has been tested and has shown itself to be efficient to such an extent that an apparatus in the order of a spine diameter of 60 meters can produce in the order of 1 megawatt of electrical power which could supply the electricity for a small community of 2,000 people in the United Kingdom. Such apparatus will have wide application in small island communities.

The apparatus described involves an advantageous bag design firstly in that bags which are side by side are coupled by corner ducts, and therefore the air within the bags is separate from the buoyancy air within the spine sections. The relative buoyancy of the whole apparatus can be easily varied by varying the buoyancy or ballasting in the spine sections, and variation in buoyancy does not effect the levelness of the apparatus in view of the ring construction. Equally, if the flexible bags fill with water for any reason, the apparatus will still not sink in view of the retained buoyancy in the spine sections.

Figure 5:
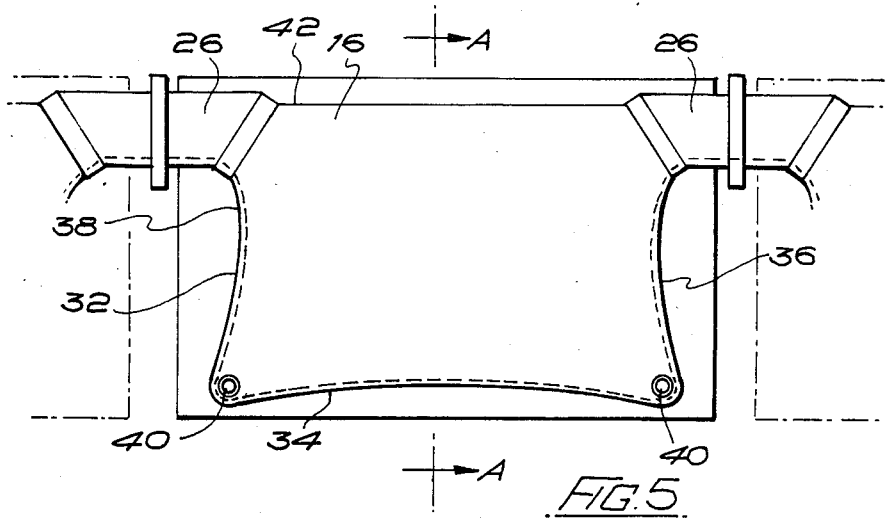
FIG. 5 shows a portion of the spine and flexible bag in side elevation.
Figure 6:
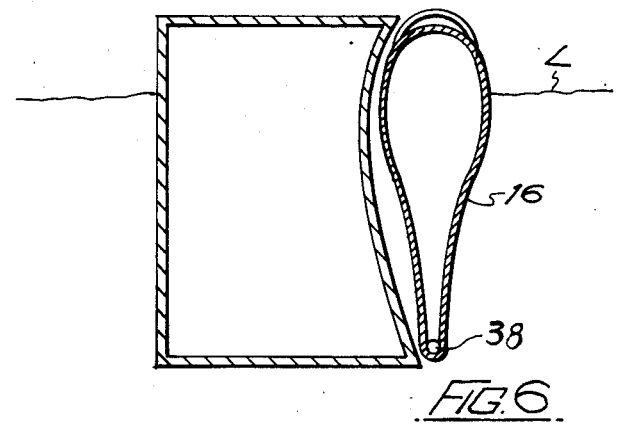
FIG. 6 is a sectional elevation taken on the line A—A in FIG. 5.

FIGS. 5 and 6 shows how the flexible bag 16 is mounted and constructed. The upper corners of the bag are connected to the respective ducts 26 as shown, but the edges 32, 34 and 36 of the bag are kept under tension by means of a catenery cable 38 which is held under tension by virtue of coupling studs 40 at the lower corners of the bag. The tension is maintained on the upper edge 42 of the bag by virtue of the air therein and the buoyancy effect of the liquid L in which the apparatus is contained. The cable 38 travels through the duct in 26 as shown, throught the respective bags 16, around the studs 40 and under tension and therefore will keep the edges 32, 34 and 36 under tension, and indeed the whole of the bag 16 is maintained under tension which is desirable, because it is a disadvantage if folds develop in the bag during the compressing and expanding, as such folds eventually would lead to failure of the bag.

Referring now to FIGS. 7, 8 and 9 of the drawings, in FIG. 7 there is illustrated a rectangular buoyant spine section 50, which will be part of the ring spine for example as illustrated in FIG. 1.

At suitable intervals along the face of the spine section 50 are fixed vertical buttresses 52 of the approximate shape as shown in FIG. 7. Between each pair of buttresses is stretched a flexible elastic membrane 54 or membrane section, so that with each side of the membrane at atmospheric pressure, it will be under tension. The edges 55 of the membrane are bonded and held to the edge faces of the buttresses 52 and the top and bottom edges 57, 59 are bonded to the top and bottom front edges of the spine so that an airtight cavity 56 (FIGS. 8 and 9) is formed between the membrane 54, the buttresses 52 and the spine 50.

As shown in FIGS. 8 and 9, each cavity 56 is pneumatically connected via a duct 58 to a self-rectifying air turbine 60. A self-rectifying turbine as already described herein rotates in the same direction regardless of the side which at any time is the high pressure side. The turbine 60 is coupled to an alternator 62 to provide output electrical power when turbine 60 is rotated.

Although not shown, the interior of the cavity 56 is coupled to an inlet for pressurising the cavity, the said inlet in its turn being coupled to a compressor which initially pressurises the cavity, and tops same up as will be explained.

It is to be mentioned that the initial tension in the membrane 54 prior to immersion in the water would be small, and in particular would be just sufficient to prevent creases from forming in the membrane when it is attached as described.

FIG. 8 shows the apparatus before insertion in the water, and if the apparatus is inserted in the water and cavity 56 is pressurised with air under pressure as mentioned above, the membrane 54 will distort in that it will deflect inwardly at the bottom, and outwardly at the top, and the central cross-sectional contour will be as shown in FIG. 9. The water level being indicated by letter L. The internal pressure in the cavity will of course be constant, whereas the external water pressure depends upon the depth, but at any point the difference in pressure between the outside and inside of the cavity will be absorbed by the tension in the membrane. There will of course be a neutral point, in the pressure reversal region, as indicated by reference numeral 64, where the internal and external pressures are equal, and the membrane will extend in a straight line between the spaced buttresses 52. Above the neutral point 64, the internal air pressure will exceed the external water and atmospheric pressure, and the membrane will bulge outwards, having its maximum deflection at the top where the water pressure over atmospheric becomes zero.

The disposition of the membrane as illustrated in FIG. 9 is related to the apparatus being in still water. The apparatus is for use in water containing waves, and the membranes are arranged to face outwardly of the ring spine. As each wave strikes the membrane 54, the membrane flexes inwards to drive air from the cavity 56, which in turn drives the turbine 60, and electrical power can be taken from the alternator 62, to provide the power output. The membrane will deflect relatively little below the neutral point 64, as the membrane is already under tension in that section due to the water pressure, but above the neutral point 64 as the membrane 54 deflects inwardly, initially the tension therein will reduce, and then, if the deflection is sufficient, the tension will reach zero value, and when the membrane starts to bulge inwards, the tension force in the membrance will again be increased. As the wave recedes, the pressure in the air duct 65 will exceed the pressure in the cavity, air will be forced back through the turbine into the cavity and the reverse movements of the membrane will occur.

The deflection of the membrane under wave action will therefore be greatest at the top and smallest at the bottom, which, as explained in our British Pat. No. 2075127, is the desirable behaviour for wave matching in that the pressure-volume characteristics of the membrane comprises a low spring rate giving highly efficient energy transfer from wave to air.

By choosing the appropriate buttress spacing, air pressure, and force/strain characteristics of the membrane, the desired response characteristics of the membrane can be achieved.

It may be found necessary to vary the force/strain characteristics of the membrane with depth in order to give the desired load/deflection response.

The internal air pressure need not necessarily be that required to exactly balance the external force of the water when the apparatus is in still water. It can be made greater or less than the balancing pressure if this is found to be desirable, the difference between external and internal forces being taken up by tensile forces in the membrane.

Since the membrane is always in tension, creasing is at least substantially avoided. By buttress design it can be arranged so that there is no contact between the membrane and the spine, so that abrasion of the membrane is avoided. It may however be desirable, when the apparatus is in still water, to allow the lower part of the membrane to contact and rest against the spine, when the cavity is unpressurised so that the tension in the lower parts of the membrane can be relieved when the cavity is in the unpressurised condition.

If it is required to direct pressure air from more than one cavity to a common turbine, intermediate buttresses would have air passages through them, thus interconnecting adjacent cavities.

The tension membrane could also be used in a system providing rectified air flow to a central turbine.

In an alternative arrangement to that shown in FIGS. 8 and 9, instead of the turbines being in the spine section, they may be in the buttresses so that the cavities are series connected as in the FIGS. 1 to 5 embodiment.

The embodiment of FIGS. 1 to 9 have a ring spine and has the advantages associated with ring spines as explained herein.

The bag may be constructed of a latex coated fabric that has suitable strengthening cording therein.

FIG. 10 shows an arrangement similar to FIG. 7, except that the face 70 of the spine section 50 which faces the rear of the membrane 54 is reverse S shaped as shown so that the membrane 54 will follow the spine surface and provide a better energy transfer characteristic.

FIG. 10 also shows that the spine has an air duct 72 extending longitudinally of the spine section 54 and a connecting duct 74 coupling the chamber 56 with the air duct 72. The turbines are not shown and the buttresses are also omitted from FIG. 10, but they will be provided to support the ends of the membrane.

The spine section may be of concrete or steel or any other suitable material.

FIGS. 11 and 12 show two air circuit arrangements for a spine according to the invention. In FIG. 11, a parallel connection arrangement is illustrated comprising a ring conduit 80 having branch lines 82 for the respective spine sections and air bags or membranes, and each line 82 contains a uni-directional turbine 83 as described herein. The connections to the bags or membranes are illustrated by reference 84.

In the arrangement of FIG. 12, the turbines 83 are in the ring conduit 80 and therefore are connected in series, wherein the turbines are connected in parallel in FIG. 11. In each case, the power outputs from the turbines 83 are aggregated to provide total output from the apparatus.

Compared to the previously proposed systems, the apparatus of the invention is of low component cost, giving higher productivity and lower energy cost.

The flexible bags can be arranged to give a high ratio of bag capacity to structural size, and the bags can be protected by suitably designing the adjacent portion of the spine. For example an over hang can be provided to protect the bag from rear waves, and bag ends and corner ducts can be protected by providing a vertical wall on the spine sections.

The substantial advantage of the ring type structure is that it is not necessary to arrange the apparatus in a particular direction when it is being powered, because the apparatus has onmi-directional energy capture in that it will extract energy regardless of the direction in which the waves meet the apparatus, and because of this mooring of the apparatus presents fewer problems.

I claim:

1. In apparatus for extracting energy from waves in a body of liquid comprising:
   (i) a plurality of elongated spine elements;
   (ii) means connecting said spine elements end to end;
   (iii) air pumping cavities on said spine elements;
   (iv) a common pumping passage extending through the spine elements;
   (v) a branch pumping passage connecting each cavity with the common pumping passage;
   (vi) flexible pumping membranes closing said cavities to form pumping chambers therewith and which membranes in use are displaced back and forth under the influence of the waves to effect pumping of air contained in the chambers through said branch passages and said common passage;
   (vii) a turbine associate with each pumping chamber and located in one of:
      (a) the associated branch passage and
      (b) the common passage so as to be rotated by said displacement of air;
   (viii) means converting said turbine rotation into electrical energy;
   the improvement comprising that the:
   (ix) spine elements are connected end to end in an endless loop with pumping cavities being provided all around the loop, and
   (x) the membranes, when the loop is in a horizontal plane in which it will lie when in the body of liquid, face the liquid horizontally so that they will be displaced horizontally by movement of the waves at front, sides and rear of the apparatus, regardless of the direction of movement of the wave front.

2. An apparatus according to claim 1, wherein said cavity is defined by a face of each spine element which is of S-shaped cross section.

3. Apparatus according to claim 1 or 2, wherein said common pumping passage is endless and passes through each spine element.

4. Apparatus according to claim 1 or 2, wherein the spine elements define a circular configuration of a diameter of the order of 60 meters.

* * * * *